(12) United States Patent
Kim et al.

(10) Patent No.: US 10,865,991 B2
(45) Date of Patent: Dec. 15, 2020

(54) COMBUSTION APPARATUS AND GAS TURBINE INCLUDING THE SAME

(71) Applicant: DOOSAN HEAVY INDUSTRIES & CONSTRUCTION CO., LTD., Changwon-si (KR)

(72) Inventors: Sung Hyun Kim, Gimhae-si (KR); Ho Keun Kim, Daejeon (KR); Chea Hong Choi, Gimhae-si (KR)

(73) Assignee: Doosan Heavy Industries Construction Co., Ltd., Gyeongsangnam-do (KR)

( * ) Notice: Subject to any disclaimer, the term of this patent is extended or adjusted under 35 U.S.C. 154(b) by 238 days.

(21) Appl. No.: 16/025,966

(22) Filed: Jul. 2, 2018

(65) Prior Publication Data

US 2019/0017707 A1    Jan. 17, 2019

(30) Foreign Application Priority Data

Jul. 14, 2017  (KR) ........................ 10-2017-0089659

(51) Int. Cl.
   *F23R 3/28*  (2006.01)
   *F23R 3/34*  (2006.01)
   (Continued)

(52) U.S. Cl.
   CPC .............. *F23R 3/343* (2013.01); *F02C 7/222* (2013.01); *F02C 7/228* (2013.01); *F02C 7/232* (2013.01);
   (Continued)

(58) Field of Classification Search
   CPC .... F23R 3/28; F23R 3/286; F23R 3/34; F23R 3/343; F23R 3/36; F02C 7/22; F02C 7/222; F02C 7/228; F02C 7/232
   See application file for complete search history.

(56) References Cited

U.S. PATENT DOCUMENTS 6,631,614 B2 * 10/2003 Mandai ................. F23D 17/002
                                          60/737
8,113,000 B2 *  2/2012 Laster .................... F23R 3/286
                                          60/39.11
(Continued)

FOREIGN PATENT DOCUMENTS

JP    2005-195284 A    7/2005
JP    2007-024357 A    2/2007
JP    2015-222063 A    12/2015

OTHER PUBLICATIONS

A Korean Office Action dated Aug. 29, 2018 in connection with Korean Patent Application No. 10-2017-0089659 which corresponds to the above-referenced U.S. application.

*Primary Examiner* — Steven M Sutherland
(74) *Attorney, Agent, or Firm* — Invenstone Patent, LLC

(57) ABSTRACT

A combustion apparatus can avoid instability in combustion by controlling a pressure ratio of fuel mixed with air. The combustion apparatus includes a casing; a pilot nozzle disposed at the center of the casing and supplied with fuel by a pilot fuel supply pipe; and a plurality of main nozzles arranged around the pilot nozzle and supplied with fuel by a main fuel supply pipe, each main nozzle including a pair of parallel fuel channels each extending to a respective fuel spray position within the main nozzle. A gas turbine adopting the combustion apparatus includes a plurality of combustors, each combustor including the casing, pilot nozzle, and plurality of main nozzles, with each main nozzle having first and second fuel channels respectively extending to a fuel spray position of the corresponding fuel channel. A pilot manifold connects the respective pilot nozzles, and a main manifold connects the respective main nozzles.

20 Claims, 8 Drawing Sheets

(51) Int. Cl.
*F02C 7/232* (2006.01)
*F02C 7/22* (2006.01)
*F23R 3/46* (2006.01)
*F02C 7/228* (2006.01)

(52) U.S. Cl.
CPC ............... *F23R 3/286* (2013.01); *F23R 3/46* (2013.01); *F05D 2270/14* (2013.01); *F23R 2900/00013* (2013.01)

(56) References Cited

U.S. PATENT DOCUMENTS

| | | | | |
|---|---|---|---|---|
| 2015/0059353 | A1* | 3/2015 | Asai | F02C 3/22 60/778 |
| 2016/0040883 | A1* | 2/2016 | Asai | F23R 3/60 60/737 |
| 2016/0305327 | A1* | 10/2016 | Patel | F23R 3/14 |
| 2017/0030583 | A1* | 2/2017 | Fujii | F02C 7/228 |

* cited by examiner

[FIG. 1]
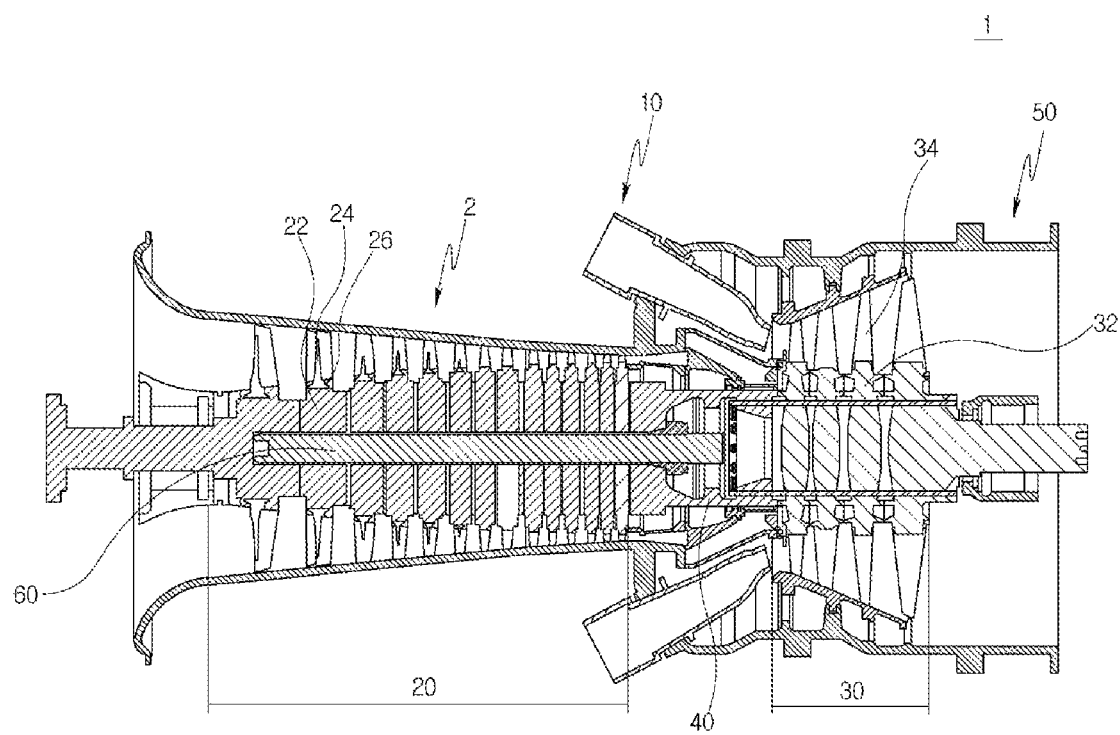

[FIG. 2]
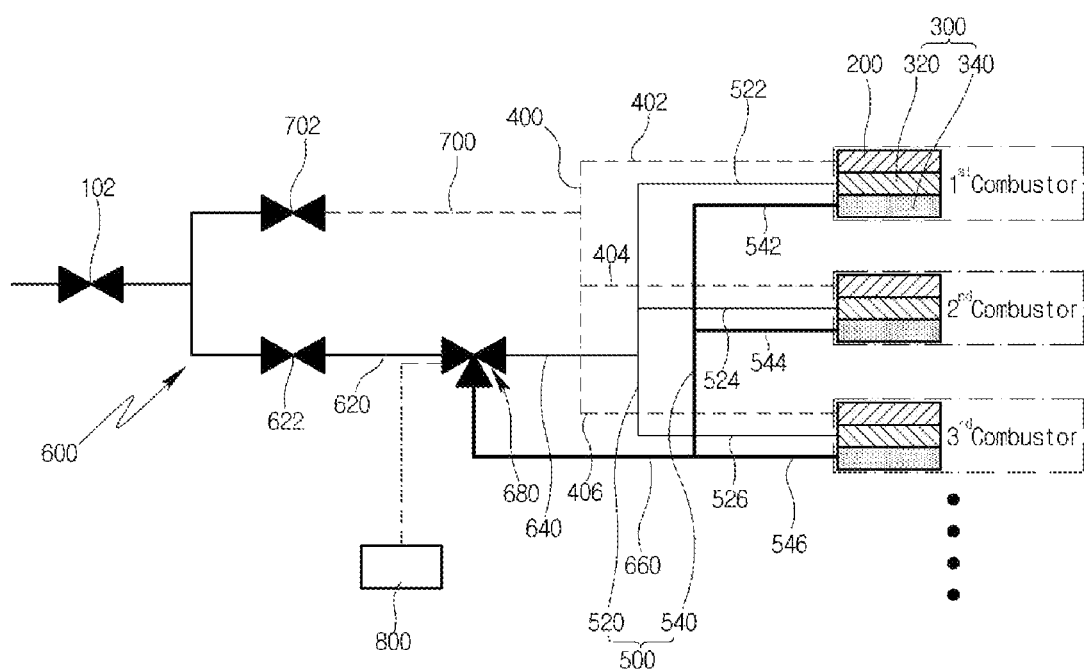

[FIG. 3]
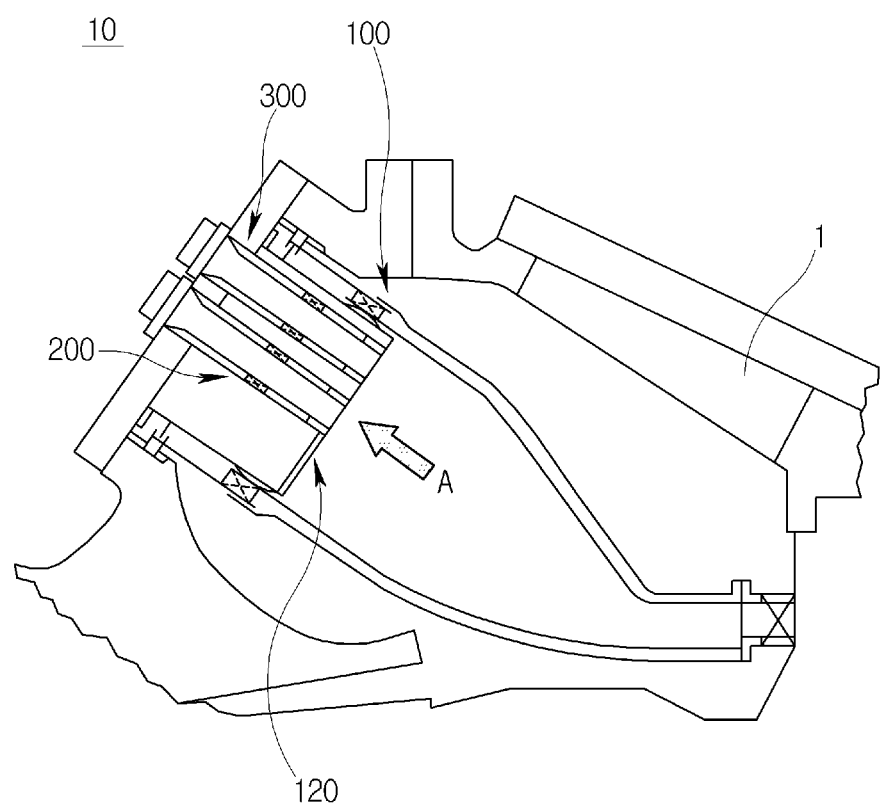

[FIG. 4]
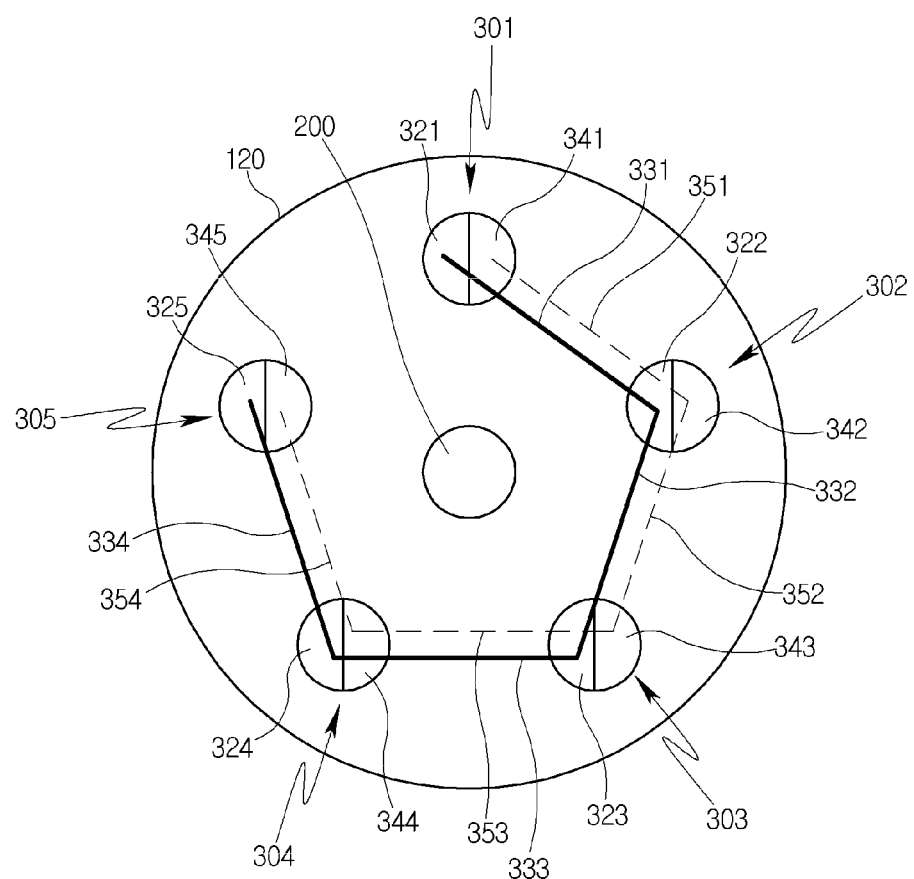
300: 301,302,303,304,305
320: 321,322,323,324,325
330: 331,332,333,334
340: 341,342,343,344,345
350: 351,352,353,354

[FIG. 5]
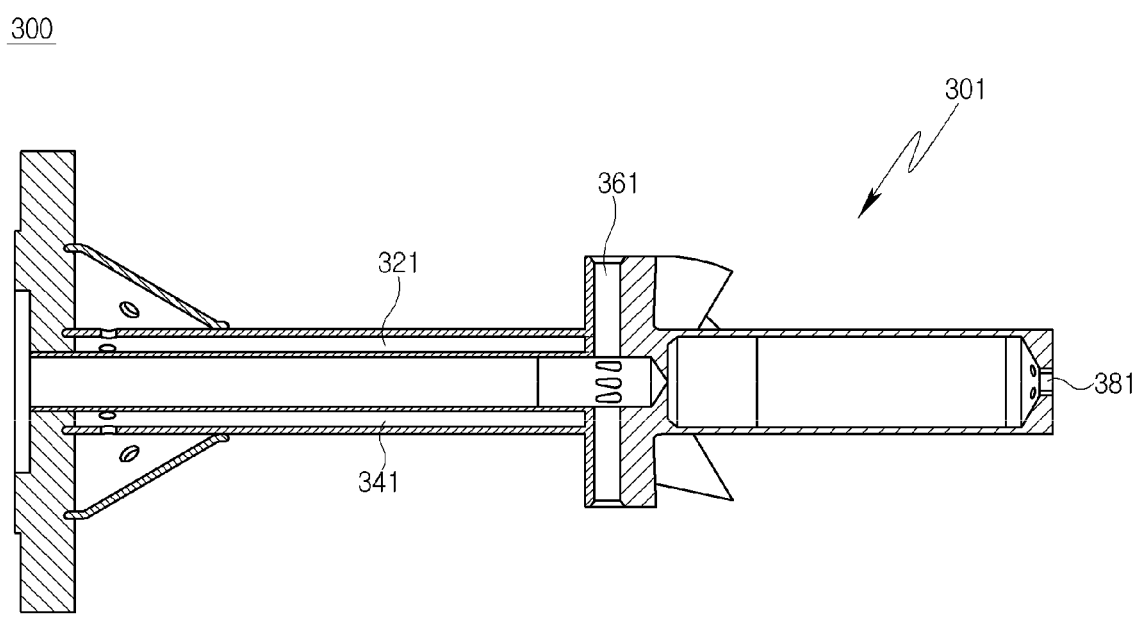

[FIG. 6]
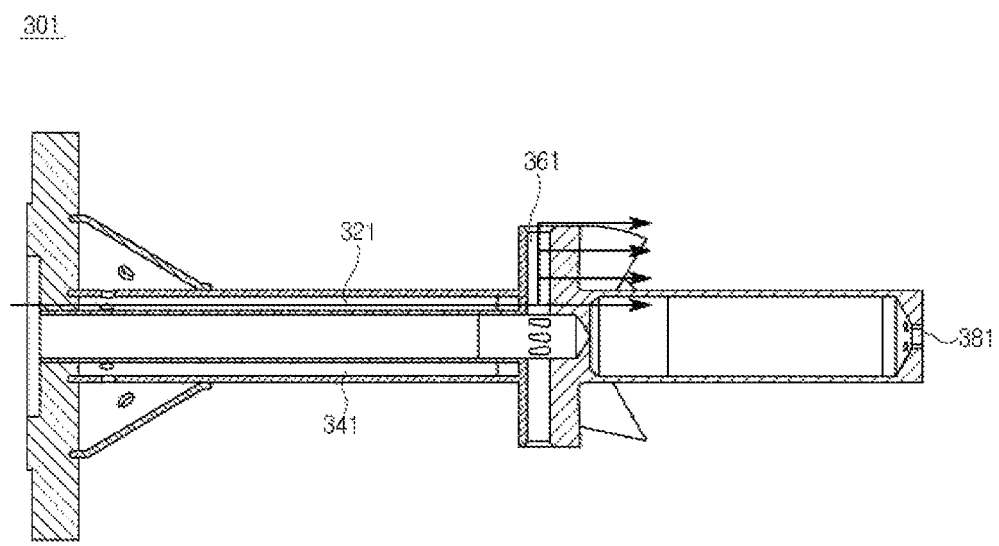

[FIG. 7]
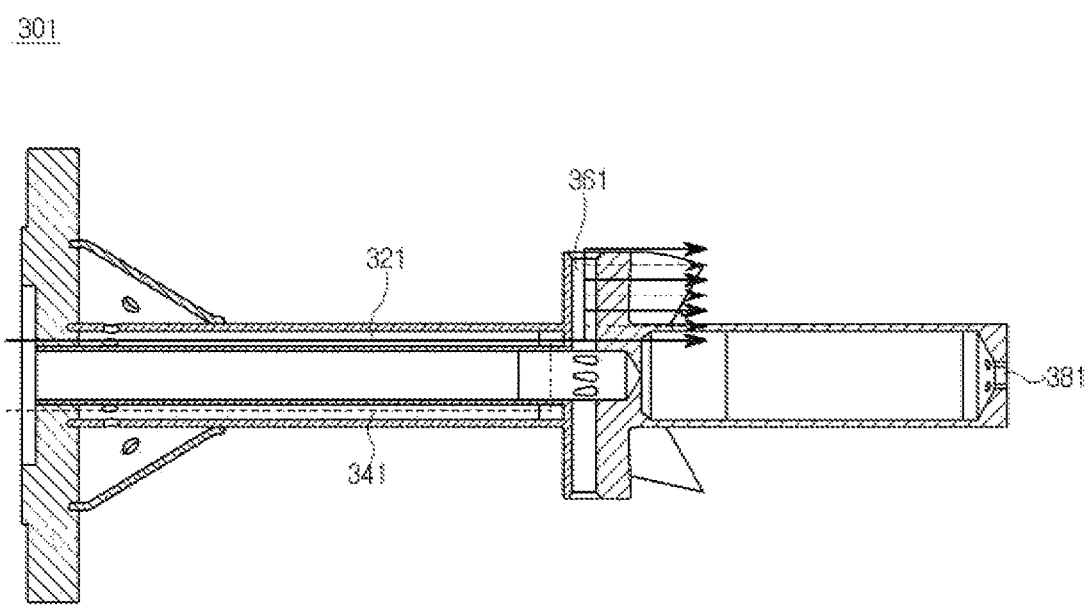

[FIG. 8]
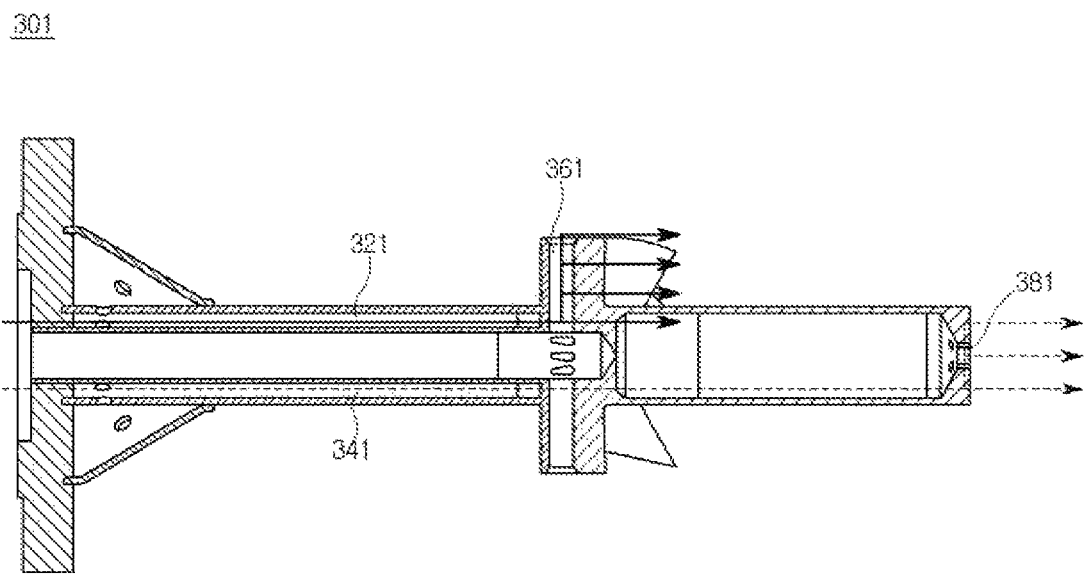

COMBUSTION APPARATUS AND GAS TURBINE INCLUDING THE SAME

CROSS-REFERENCE TO RELATED APPLICATIONS

This application claims priority to Korean Patent Application No. 10-2017-0089659, filed on Jul. 14, 2017, the disclosure of which is incorporated herein by reference in its entirety.

BACKGROUND OF THE INVENTION

Field of the Invention

Exemplary embodiments of the present disclosure relate to a combustion apparatus and a gas turbine including the same, and more particularly, to a combustion apparatus capable of avoiding instability in combustion by controlling a pressure ratio of fuel mixed with air, and a gas turbine including the same.

Description of the Related Art

The allowable emission quantity of nitrogen oxides (NOx) and carbon monoxide (CO) from exhausts of gas turbines have been steadily reduced in view of environmental concerns. One method to achieve a very low exhaust release while maintaining high efficiency is to use a combustion system based on a weak pre-mixed concept. In this type of system, fuel and air are completely pre-mixed before combustion. The pre-mixing may be achieved by various methods. As a result, a concentration of a generated mixture of fuel/air becomes sufficiently weak, such that a flame temperature during combustion is low enough to minimize the generation of nitrogen oxide (NOx). A mixing ratio of fuel/air is about ½ of a theoretical mixing ratio, which is only slightly larger than a mixing ratio at which a reaction is no longer self-maintained (a weak limit) and a flame is extinguished.

However, since such combustion systems operate near a reaction weak limit, there may be a significant problem associated with combustion stability which does not normally occur in a conventional gas turbine using a diffusion flame operating at the theoretical mixing ratio of fuel/air.

This instability may occur by a fluctuation pressure field in a combustor which is often amplified through various physical mechanisms associated with an overall design of the combustion system. If dynamic pressure exceeds an allowable value, the operation of the gas turbine and/or a mechanical life span of the combustion system are seriously affected.

A typical weak premixing combustion system includes a premixing zone, a flame holder and reaction zone, first-stage gas turbine nozzles, and a fuel and air supply system. According to the weak premixing combustion method, the fuel and air are separately supplied from supply sources having different dynamic characteristics for the premixing zone. When entering the reaction zone, the premixed fuel/air mixture is ignited by high temperature gas maintained within a separate zone of the flame holder. After combustion, the generated high temperature gas flows through the first-stage turbine nozzle, and the nozzles accelerate the flow through a first-stage turbine blade.

In this case, if a pressure ratio of the supplied air/fuel is high, the fuel and air are mixed with each other, which causes the generation of a swirl, such that the combustion becomes unstable. As a result, as a heat release locally appears to be different, a fluctuation in the mixing ratio of the fuel and air and noise occur.

In addition, a gas flow temperature depends on the mixing ratio of fuel/air entering the reaction zone. When the mixing ratio is more than a mixing ratio at which the reaction is maintained, a change in a combustion temperature according to a change in the mixing ratio is nearly linear. However, as the mixing ratio closes to the weak limit and passes though the weak limit, the change in the gas temperature according to the change in the mixing ratio becomes much larger until the flame is finally extinguished.

Specifically, a pressure pulse caused from basic combustion noise or any kind of system upset propagates to a pre-mixer through the system. Since an amount of fuel and air supplied to the pre-mixer depends on a pressure in the pre-mixer, such a pressure change, that is, the pressure pulse changes both the mass and flow rate of fuel and air. Since dynamic responses of the fuel and air supply systems are different, the mixing ratio of fuel/air of the pre-mixer is changed.

Such fuel and air of a new mixing ratio of fuel/air enter the reaction zone in which the fuel is combusted to generate new and different high gas temperature. In addition, the combustion gas of the new temperature enters the first-stage turbine nozzle. Since a nozzle back pressure depends on the gas temperature, a change in the back pressure occurs.

The new pressure propagates to the pre-mixer and a cycle is repeated. Therefore, when an average mixing ratio of fuel/air within the pre-mixer closes to the weak limit, small changes of the mixing rate of fuel/air may cause a large fluctuation in the temperature and pressure of gas. As a result, an operation in this state is particularly unstable.

SUMMARY OF THE INVENTION

An object of the present disclosure is to provide a combustion apparatus capable of avoiding instability in combustion by controlling a pressure ratio of fuel mixed with air, and a gas turbine including the same.

According to the present disclosure, the entire flow rate of the required fuel is controlled by a fuel flow rate control valve (FCV), and two fuel channels of a fuel nozzle (a main nozzle) are formed, thereby making it possible to control a pressure ratio of the fuel if necessary.

As such, as the pressure ratio of the fuel mixed with the air is controlled by controlling the flow rate of the fuel distributed to each of the fuel channels, that is, a spray pressure of the fuel is reduced, fluctuation in the mixing ratio of the fuel and the air may be minimized, and an unstable heat release may be reduced to thereby ultimately avoid instability in the combustion.

In accordance with one aspect of the present disclosure, a combustion apparatus may include a casing; a pilot nozzle disposed at the center of the casing and supplied with fuel by a pilot fuel supply pipe; and a plurality of main nozzles arranged around the pilot nozzle and supplied with fuel by a main fuel supply pipe, each main nozzle including a pair of parallel fuel channels each extending to a respective fuel spray position within the main nozzle.

The combustion apparatus may further include a pilot fuel flow rate control valve for controlling a flow rate of the fuel supplied through the pilot fuel supply pipe; and a main fuel flow rate control valve for controlling a flow rate of the fuel supplied through the main fuel supply pipe.

The main fuel supply pipe may include a main pipe in which the main fuel flow rate control valve is installed; and a pair of fuel supply pipes for respectively supplying fuel from the main pipe to either channel of the pair of parallel fuel channels.

The combustion apparatus may further include a three-way valve installed in the main pipe to control a flow rate of fuel distributed to either channel of the pair of parallel fuel channels.

The pair of fuel supply pipes may include a first fuel supply main pipe branched from the main pipe and connected to a first main manifold for supplying fuel to one channel of the pair of parallel fuel channels; and a second fuel supply pipe branched from the main pipe and connected to a second main manifold for supplying fuel to the other channel of the pair of parallel fuel channels. The combustion apparatus may further include a first two-way valve installed in the first fuel supply pipe to control a flow rate of fuel distributed to one channel of the pair of parallel fuel channels; and a second two-way valve installed in the second fuel supply pipe to control a flow rate of fuel distributed to the other channel of the pair of parallel fuel channels.

The combustion apparatus may further include a controller for controlling a flow rate of fuel distributed to either channel of the pair of parallel fuel channels. The flow rate of the distributed fuel may be controlled according to a pressure ratio of the fuel mixed with air.

The fuel of the main fuel supply pipe may be delivered entirely to only one channel of the pair of parallel fuel channels when a pressure of the fuel is lower than or equal to a pressure of the air, or the fuel of the main fuel supply pipe may be divided and distributed to either channel of the pair of parallel fuel channels respectively when the pressure of the fuel is higher than the pressure of the air. When a pressure of the fuel is higher than a pressure of the air, the fuel of the main fuel supply pipe may be distributed to either channel of the parallel fuel channels and otherwise delivered entirely to only one channel of the parallel fuel channels. Alternatively, when combustion instability occurs, the fuel of the main fuel supply pipe may be distributed to either channel of the parallel fuel channels and otherwise delivered entirely to only one channel of the parallel fuel channels.

The combustion apparatus may further include a first connection pipe for daisy-chaining one channel of the pair of parallel fuel channels of each main nozzle, which channels are respectively adjacent to one another; and a second connection pipe for daisy-chaining the other channel of the pair of parallel fuel channels of each main nozzle, which channels are respectively adjacent to one another, wherein the pair of fuel supply pipes includes first and second fuel supply pipes respectively branched from the main pipe, the first fuel supply pipe being connected to only one of the channels daisy-chained by the first connection pipe, the second fuel supply pipe being connected to only one of the channels daisy-chained by the second connection pipe.

The respective fuel spray positions of the pair of parallel fuel channels may each occur where the fuel is sprayed into a mixing zone for pre-mixing air and fuel. Alternatively, the fuel spray position of one of the pair of parallel fuel channels may occur where the fuel is sprayed into a mixing zone for pre-mixing air and fuel, and the fuel spray position of the other of the pair of parallel fuel channels may occur where the fuel is sprayed to a zone in which the air and the fuel meet and a diffusion flame occurs.

The pair of parallel fuel channels may include a first fuel channel extending lengthwise along one side of a corresponding main nozzle; and a second fuel channel extending lengthwise along a side opposite to the one side of the corresponding main nozzle, in parallel to the first fuel channel.

In accordance with another aspect of the present disclosure, a gas turbine may include a compressor for sucking air and compressing the sucked air to a high pressure; a plurality of combustors for mixing the compressed air with fuel and combusting the mixture a turbine for generating electric power by rotating a turbine blade using high temperature and high pressure combustion gas discharged from the combustors; a pilot manifold connected to the respective pilot nozzles of the plurality of combustors and supplied with fuel by a pilot fuel supply pipe; and a main manifold connected to the respective main nozzles of the plurality of combustors and supplied with fuel by a main fuel supply pipe. Here, each combustor may include a casing, a pilot nozzle disposed at the center of the casing, and a plurality of main nozzles arranged around the pilot nozzle, each main nozzle including a first fuel channel extending to a fuel spray position of the first fuel channel and a second fuel channel extending to a fuel spray position of the second fuel channel.

The gas turbine may further include a pilot fuel flow rate control valve for controlling a flow rate of the fuel supplied through the pilot fuel supply pipe; and a main fuel flow rate control valve for controlling a flow rate of the fuel supplied through the main fuel supply pipe.

The main fuel supply pipe of the main manifold may include a main pipe in which the fuel flow rate control valve is installed; a first fuel supply main pipe branched from the main pipe and supplying the fuel to a first main manifold connected to each of the first fuel channels; and a second fuel supply pipe branched from the main pipe and supplying the fuel to a second main manifold connected to each of the second fuel channels.

The gas turbine may further include a three-way valve installed at a point at which the first fuel supply pipe and the second fuel supply pipe are branched from the main pipe to control the flow rate of the fuel distributed to the first fuel supply pipe and the second fuel supply pipe.

A plurality of first main branch pipes may extend to connect the first fuel channels of the respective combustors from the first main manifold, with one first main branch pipe connected to connect one first fuel channel per each combustor, and the respective first fuel channels of the respective combustors all connected to each other by a first connection pipe connecting the first fuel channels which are adjacent to each other. A plurality of second main branch pipes may extend to connect the second fuel channels of the respective combustors from the second main manifold, with one second main branch pipe connected to connect one second fuel channel per each combustor, and the respective second fuel channels of the respective combustors all connected to each other by a second connection pipe connecting the second fuel channels which are adjacent to each other.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 is a cross-sectional view showing a gas turbine according to an exemplary embodiment of the present disclosure;

FIG. 2 is a schematic diagram of a combustion apparatus in the gas turbine of FIG. 1;

FIG. 3 is a cross-sectional view of one combustor of the gas turbine shown in FIG. 1;

FIG. 4 is a cross-sectional view of the combustor of FIG. 3 from the direction of arrow A;

FIG. 5 is a cross-sectional view of one main nozzle of the combustor shown in FIG. 3; and FIGS. 6-8 are cross-sectional views of the main nozzle of FIG. 5, respectively showing three operational states of the combustion apparatus of the present disclosure.

DESCRIPTION OF SPECIFIC EMBODIMENTS

Hereinafter, exemplary embodiments of a combustion apparatus and a gas turbine including the same according to the present disclosure will be described with reference to the drawings, in which like reference designations indicate the same or similar elements.

First, a gas turbine according to an exemplary embodiment of the present disclosure will be described with reference to FIG. 1.

A gas turbine 1 may generally include a compressor 20 for sucking air and compressing the air to a high pressure, a combustor 10 for mixing the air compressed air by the compressor 20 with fuel and combusting the mixture of air and fuel, and a turbine 30 for generating electric power by rotating a turbine blade using high temperature and high pressure combustion gas discharged from the combustor 10.

Specifically, the gas turbine 1 may include a housing 2, and referring to a flow direction of the air, the compressor 20 is positioned on an upstream side of the housing 2 and the turbine 30 is disposed on a downstream side thereof. A rotatory power transfer part 40, which is a torque transfer member for transferring rotational torque generated in the turbine 30 to the compressor 20, is disposed between the compressor 20 and the turbine 30. A diffuser 50 from which combustion gas passing through the turbine 30 is discharged is formed on a rear side of the housing 2, and the combustor 10 supplied with the compressed air and combusting the compressed air is disposed in the front of the diffuser 50.

The compressor 20 includes a plurality (e.g., fourteen) of compressor rotor disks 22, and the respective compressor rotor disks 22 are fastened to each other by a tie rod 60 so as not to be spaced apart from each other in an axial direction.

The tie rod 60 is disposed to penetrate central portions of the plurality of compressor rotor disks 22. One end of the tie rod 60 is fixed to the forwardmost compressor rotor disk 22 and the other end is fixed to the rotatory power transfer part 40. The tie rod 60 may be variously structured according to the gas turbine, and is not limited to the configuration shown in FIG. 1. That is, one tie rod may penetrate the central portions of the rotor disks as shown, a plurality of tie rods may be disposed in a circumferential pattern, or a combination thereof may be employed.

The compressor rotor disks 22 are aligned with each other along the axial direction in a state in which the tie rod 60 penetrates the approximate centers thereof. Here, opposing surfaces of adjacent compressor rotor disks 22 are held tightly together by the tie rod 60 such that their relative rotation is not possible.

A plurality of compressor blades 24 are radially coupled to outer circumference surfaces of the compressor rotor disks 22. Each of the compressor blades 24 includes a root part 24 and is fastened to the compressor rotor disk 22.

A fastening method of the root part 26 includes a tangential type and an axial type. The fastening method may be selected according to a required structure of a commercial gas turbine, and known fastening methods typically include dovetail and fir-tree techniques, though the blade may be fastened to the rotor disk using other apparatuses such as a key, a bolt, or the like.

A vane fixed to the housing 2 is disposed between the respective compressor rotor disks 22. The vane, which is fixed and does not rotate like the compressor rotor disk 22, serves to align a flow of the compressed air passing through the compressor blades 24 of the compressor rotor disks 22 to guide it to the compressor blade of the rotor disk positioned downstream.

As such, the air may be sucked through the compressor 20, pass through the plurality of compressor blades 24 and the vane, be compressed in multi-stages, and be then supplied to the turbine 30 through the combustor 10.

Although not shown, a vane serving as a guide vane at a next position of the diffuser may be installed in the compressor 20 of the gas turbine in order to increase a pressure of a fluid and to then match a flow angle of the fluid entering an inlet of the combustor 10 to a design flow angle.

The combustor 10 mixes fuel with the compressed air introduced from the compressor 20 and combusts the mixture, to produce high temperature and high pressure combustion gas of high energy. That is, a temperature of the combustion gas is increased by a constant pressure combustion process up to a heat-resistance limit that the combustor and turbine parts may withstand.

The combustor 10 constituting the combustion apparatus of the gas turbine includes a plurality of combustors 10, each having a can-type configuration and general shape, which are arranged around the gas turbine 1 so as to be installed along a circumference direction of the gas turbine 1. The combustor 10 may include a burner including a fuel spray nozzle, a combustor liner, and a transition piece, which is a connection part between the combustor 10 and the turbine 30.

The combustion liner provides a combustion space in which the fuel sprayed by the fuel spray nozzle is mixed with the compressed air of the compressor 20 and where combustion occurs. Such a liner may include a flame barrel providing the combustion space in which the fuel-air mixture is combusted, and a flow sleeve forming an annular space while surrounding the flame barrel. The fuel spray nozzle is coupled to the front end of the liner, and an ignition plug may be coupled to a sidewall of the liner.

The transition piece is connected to the rear end of the liner so that the combustion gas combusted by the ignition plug may be transferred to the turbine 30 side. The transition piece may have its outer wall cooled by the compressed air supplied from the compressor 20 to prevent damage due to a high temperature of the combustion gas.

The high temperature and high pressure combustion gas generated from the plurality of combustors 10 is supplied to the turbine 30, and the supplied combustion gas expands and provides impulse and reaction to rotating blades of the turbine to produce rotational torque. The thus-obtained rotational torque is transferred to the compressor 20 through the rotatory power transfer part 40, and the power remaining after driving the compressor is used to drive a generator or similar apparatus to produce electric power.

The basic structure of the turbine 30 is similar to that of the compressor 20. That is, similar to the compressor rotor disks 22 of the compressor 20, the turbine 30 includes a plurality of turbine rotor disks 32. In addition, the turbine 30 includes a plurality of turbine blades 34 disposed radially on outer circumferential surfaces of the turbine rotor disks 32. In this case, the turbine blades 34 may be coupled to the turbine rotor disks 32 by a dovetail method or similar means. A plurality of vanes may be respectively provided between the turbine blades 34 of the turbine rotor disks 32 to guide a flow direction of the combustion gas passing through the turbine blades 24.

In the gas turbine having the structure as described above, the introduced air is compressed in the compressor 20, is combusted in the combustor 10, is transferred to the turbine 30 to drive the turbine, and is then discharged to the atmosphere through the diffuser 50. Such a gas turbine is merely an example of the present disclosure, and the combustion apparatus according to the present disclosure to be described below in detail may be applied to any general gas turbine.

Hereinafter, the combustion apparatus according to the present disclosure is applied will be described in detail with reference to the drawings.

FIG. 3 shows one combustor of the gas turbine shown in FIG. 1, to explain the basic configuration of the combustor 10 of the gas turbine 1 adopting the combustion apparatus according to the present disclosure. Each combustor 10 includes a casing 100, a pilot nozzle 200 installed so as to be disposed at the center of the casing 100, and a plurality of main nozzles 300 installed along a circumference direction of the pilot nozzle 200 so as to be arranged around the pilot nozzle 200. The plurality of main nozzles 300 may be spaced at a constant interval, along a circumference direction around the pilot nozzle 200, and may be arranged to have at a constant angle with respect to each other.

The casing 100 may be a can type, an annular type, or a can-annular type. Here the casing 100 may generally refer to an outer shape of the combustor 10 including the liner and the transition piece.

The pilot nozzle 200, which is a nozzle for supplying sufficient fuel to maintain a flame, has one fuel channel in the present exemplary embodiment. However, the pilot nozzle 200 is not limited to this configuration and may also be formed to have two different fuel channels, similar to the main nozzles 300 to be described below.

A combustor cap 120 may be installed to be adjacent to the combustor 10.

FIG. 4 is a view of the combustor 10 of FIG. 3 from the direction of arrow A, to illustrate the arrangement of the plurality of main nozzles 300 with respect to the pilot nozzle 200. The plurality of main nozzles 300 according to the present exemplary embodiment include a total of five main nozzles 301, 302, 303, 304, and 305 respectively arranged around the pilot nozzle 200. However, the main nozzles are limited to this configuration, and the number of the main nozzles may vary.

In this case, the respective main nozzles 300 (301, 302, 303, 304, and 305) include first fuel channels 320 (321, 322, 323, 324, and 325) and second fuel channels 340 (341, 342, 343, 344, and 345) which are formed to face each other and be parallel to each other. The pilot nozzle 200 is disposed at the center, and the five main nozzles 301, 302, 303, 304, and 305 are disposed along the circumference around the pilot nozzle.

In this case, each main nozzle 300 includes two different fuel channels for supplying the fuel, that is, a first fuel channel 320 and a second fuel channel 340. A total five of first fuel channels 320 are connected to each other by a first connection pipe 330, and a total five of second fuel channels 340 are connected to each other by a second connection pipe 350.

Specifically, a first fuel channel 321 of the first main nozzle 301 and a first fuel channel 322 of the second main nozzle 302 adjacent thereto are connected to each other by a connection pipe segment 331. Similarly, the first fuel channel 322 of the second main nozzle 302 is connected to a first fuel channel 323 of the third main nozzle 303 by a connection pipe segment 332; the first fuel channel 323 of the third main nozzle 303 and a first fuel channel 324 of the fourth main nozzle 304 are connected to each other by a connection pipe segment 333; and the first fuel channel 324 of the fourth main nozzle 304 and a fifth fuel channel 325 of the fifth main nozzle 305 are connected to each other by a connection pipe segment 334. Thus, the first connection pipe 330 connects, or joins together, the first fuel channel 320 of each of the plurality of main nozzles 300 by daisy-chaining the five first fuel channels 321-325 which are respectively adjacent to one another.

In the same manner, the second fuel channels 341, 342, 343, 344, and 345 of the respective main nozzles may also be sequentially connected to each other by the respective connection pipe segments 351, 352, 353, and 354 of the second connection pipe 350 in the same way as the connection structure of the first fuel channels. Thus, the second connection pipe 350 connects, or joins together, the second fuel channel 340 of each of the plurality of main nozzles 300 by daisy-chaining the five second fuel channels 341-345 which are respectively adjacent to one another.

In the present exemplary embodiment, the first fuel channel 321 of the first main nozzle 301 and the first fuel channel 325 of the fifth main nozzle 305 are not connected to each other, but may be so connected for a smooth flow of the fuel.

Accordingly, even though the fuel is supplied to only the first fuel channel 321 of the first main nozzle 301, since the fuel may be supplied to all of the first fuel channels 322, 323, 324, and 325 of the second to fifth main nozzles 302, 303, 304, and 305 through the first connection pipe 330, a structure is simpler than a case in which a pipe for supplying the fuel to each of the first fuel channels of each of the main nozzles is installed. However, in a case in which the respective first fuel channels are not connected to each other by the first connection pipe 330, the pipe for supplying the fuel to each of the first fuel channels of each of the main nozzles may also be separately formed.

Next, the main nozzle 300 will be described in detail along a length direction of the combustor 10 with reference to FIG. 5, which is based on the first main nozzle 301.

Referring to FIG. 5, the first main nozzle 301 includes a pair of parallel fuel channels respectively disposed on both (opposite) sides of the first main nozzle 301 so as to face each other along the length of the nozzle. The parallel fuel channels include a first fuel channel 321 and a second fuel channel 341 which respectively extend, in parallel to each other, lengthwise along two sides of the first main nozzle 301. Accordingly, the first main nozzle 301 may supply the fuel through at least one channel of the first fuel channel 321 and the second fuel channel 341.

As such, as an area to which the fuel is supplied is controlled by allowing the fuel to be supplied through one fuel channel or to be supplied through both of two fuel channels, a spray pressure of the fuel supplied through the first main nozzle 301 may be controlled. This controlled supply will be described below in detail.

In addition, the fuel supplied through the first fuel channel 321 and the second fuel channel 341 may be sprayed from the same or different positions within the main nozzle 301.

According to the present exemplary embodiment, a pair of sprayers for spraying the fuel are provided. Specifically, a first sprayer 361 is positioned at a middle portion of the nozzle to spray the fuel into a mixing zone for pre-mixing the air compressed by the compressor 20 with the fuel, and a second sprayer 381 is positioned at a tip of the nozzle to spray the fuel into a zone in which a diffusion flame appears from a surface on which the compressed air and the fuel meets.

In this case, the fuel supplied through at least one channel of the first fuel channel 321 and the second fuel channel 341 may also be sprayed through only the first sprayer 361 according to an operation state of the nozzle, or may also be sprayed at different positions through both the first and second sprayers 361 and 381.

Specifically, as shown in FIG. 6, the fuel may be supplied through only the first fuel channel 321, and sprayed into the pre-mixing zone through the first sprayer 361. As shown in FIG. 7, the fuel may be distributed and supplied to the first fuel channel 321 and the second fuel channel 341, and the distributed and supplied fuels meet at the middle portion of the nozzle and are sprayed into the pre-mixing zone through the first sprayer 361. As shown in FIG. 8, the fuel may be distributed and supplied to the first fuel channel 321 and the second fuel channel 341, and the fuel supplied through the first fuel channel 321 is sprayed to the pre-mixing zone through the first sprayer 361, while the fuel supplied through the second fuel channel 341 flows up to the tip of the nozzle and is sprayed into the zone in which the diffusion flame appears through the second sprayer 381.

If a diffusion flame appears, the combustion temperature may be increased and a risk of instability in combustion may be reduced. However, since the diffusion flame may increase NOx release, a portion of the fuel is sprayed into the pre-mixing zone and only a portion of the fuel is supplied for the diffusion flame as in the operation state of FIG. 8, thereby making it possible to reduce instability in combustion and to improve combustion performance.

Finally, a structure and operation of a combustion apparatus in which the fuel is supplied to the plurality of combustors 10 will be described in detail with reference to FIG. 2. FIG. 2 shows just three of the plurality of combustors 10 of the combustion apparatus of the present disclosure, but the number of combustors may vary.

The respective pilot nozzles 200 of the plurality of combustors 10 are all connected to a pilot manifold 400, and the pilot manifold 400 is connected to a pilot fuel supply pipe 700 for supplying the fuel.

Specifically, the pilot nozzles of each of the combustors are connected to each other by the respective pilot branch pipes 402, 404, and 406 branched from the pilot manifold 400, and the pilot fuel supply pipe 700 is connected to the front end of the pilot manifold 400. As the fuel is supplied to the pilot manifold 400, the fuel may be supplied to the respective pilot nozzles 200 of the three combustors though the respective pilot branch pipes 402, 404, and 406.

In this case, the pilot fuel supply pipe 700 may be provided with a pilot fuel flow rate control valve 702 for controlling a flow rate of the entire fuel supplied to the respective pilot nozzles 200.

In addition, the respective main nozzles 300 of the plurality of combustors 10 are all connected to a main manifold 500, and the main manifold 500 is connected to a main fuel supply pipe 600 for supplying the fuel.

In this case, since each of the main nozzles 300 includes the first fuel channel 320 and the second fuel channel 340 which are different from each other, the main manifold 500 includes a first main manifold 520 connected to each of the first fuel channels 320 and a second main manifold 540 connected to each of the second fuel channels 340.

Accordingly, the first fuel channels 320 of each of the combustors are connected to each other by the respective first main branch pipes 522, 524, and 526 branched from the first main manifold 520, and the second fuel channels 340 of each of the combustors are connected to each other by the respective second main branch pipes 542, 544, and 546 branched from the second main manifold 540.

In addition, the main fuel supply pipe 600 includes a main pipe 620 and a pair of fuel supply pipes for respectively supplying fuel from the main pipe 620 to either of the parallel fuel channels 321 and 341. The pair of fuel supply pipes includes a first fuel supply pipe 640 branched from the main pipe 620 to supply the fuel to the first main manifold 520, and a second fuel supply pipe 660 branched from the main pipe 620 to supply the fuel to the second main manifold 540.

In this case, the main fuel supply pipe 600, specifically, the main pipe 620 may be provided with a fuel flow rate control valve 622 for controlling a flow rate of the entire fuel supplied to the respective main nozzles 300.

Accordingly, the fuel supplied to the first fuel supply pipe 640 through the main pipe 620 may be supplied to the first main manifold 520 and may be supplied to the respective first fuel channels 320 of the three combustors through the respective first main branch pipes 522, 524, and 526. In this case, the respective first main branch pipes 522, 524, and 526 individually extend to each combustor to connect one first fuel channel 320 of the plurality of main nozzles of each combustor. As described above, since the first fuel channels 321, 322, 323, 324, and 325 of the plurality of main nozzles in each combustor are all connected to each other through the first connection pipe 330, the fuel may be supplied to all of the first fuel channels even though the fuel is supplied to only one first fuel channel. According to the present exemplary embodiment, the respective first main branch pipes 522, 524, and 526 are connected the first fuel channel 321 of the first main nozzle 301 of each combustor as shown in FIG. 4.

In addition, the fuel supplied to the second fuel supply pipe 660 through the main pipe 620 may be supplied to the second main manifold 540 and may be supplied to the respective second fuel channels 340 of the three combustors through the respective second main branch pipes 542, 544, and 546. In this case, the respective second main branch pipes 542, 544, and 546 individually extend to each combustor to connect one second fuel channel 340 of the plurality of main nozzles of each combustor. As described above, since the second fuel channels 341, 342, 343, 344, and 345 of the plurality of main nozzles in each combustor are all connected to each other through the second connection pipe 350, the fuel may be supplied to all of the second fuel channels even though the fuel is supplied to only one second fuel channel. According to the present exemplary embodiment, the respective second main branch pipes 542, 544, and 546 are connected the second fuel channel 341 of the first main nozzle 301 of each combustor as shown in FIG. 4.

In addition, a three-way valve 680 for controlling a flow rate of the fuel distributed to the first fuel supply pipe 640 and the second fuel supply pipe 660 may be installed at a point at which the first fuel supply pipe 640 and the second fuel supply pipe 660 are branched from the main pipe 620. Thus, the three-way valve 680 is installed in the main pipe 620 to control a flow rate of fuel distributed to the first fuel channel 320 and the second fuel channel 340.

As such, as the three-way valve 680 is installed, the fuel supplied to the main pipe 620 may be supplied to any one of the first fuel supply pipe 640 and the second supply pipe 660, or may be supplied to be divided by a predetermined distribution ratio. Accordingly, the flow rate of the fuel supplied to the first fuel channel 320 and the second fuel channel 340 of each combustor may be controlled. However, the present disclosure is not limited this configuration, and a two-way valve may be installed in each of the first fuel supply pipe 640 and the second fuel supply pipe 660.

In addition, the combustion apparatus may further include a controller 800 for controlling the flow rate of the fuel distributed to the first fuel channel 320 and the second fuel channel 340.

According to the present exemplary embodiment, the controller 800 is connected to the three-way valve 680 to control the three-way valve, thereby controlling the flow rate of the fuel distributed to the first fuel supply pipe 640 and the second fuel supply pipe 660.

The controller 800 may control the flow rate of the fuel distributed to the first fuel channel 320 and the second fuel channel 340 according to the pressure ratio of the fuel mixed with the compressed air.

Specifically, when the pressure of the fuel is equal to or lower than the pressure of the compressed air, the controller 800 distributes all of the fuel to the first fuel channel 320 as shown in FIG. 6, and when the pressure of the fuel is higher than the pressure of the compressed air or instability in combustion occurs, the controller 800 may divide and distribute the fuel to the first fuel channel 320 and the second fuel channel 340 as shown in FIGS. 7 and 8. However, the controller is not limited to this configuration, and in a case in which combustion instability occurs while the pressure of the fuel is lower than or equal to the pressure of the compressed air, the controller may also avoid instability by controlling a distribution ratio of the first and second fuel channels.

As such, the controller 800 may also determine and control a spray pressure of the fuel before the fuel passes through the nozzle and is mixed with the air, and may also perform a control to control fluctuation in a mixing ratio of air/fuel that may cause instability in combustion according to characteristics of the spray pressure.

Specifically, if the spray pressure of the fuel is too high as compared to the air, a swirl occurs while the fuel is mixed with the air such that the combustion becomes unstable, and there is a risk that acoustic resonance occurs because a heat release appears locally to be different. Therefore, the controller 800 performs a control so that the fuel supplied from the main pipe 620 is divided into the first fuel supply pipe 640 and the second fuel supply pipe 660, that is, is divided and supplied to the first fuel channel 320 and the second fuel channel 340, thereby increasing an area to which the fuel is supplied even though an amount of supplied fuel is the same and allowing the spray pressure to be reduced.

As such, as the fluctuation in the mixing ratio of fuel and air is minimized by reducing the spray pressure, instability in combustion may be avoided.

In addition, if only one fuel channel is used, the nozzle may be used as a choking nozzle, and if both the two fuel channels are used, the nozzle may also be used as a soft nozzle.

Further, a shutoff valve 102 may be installed upstream of both the pilot fuel supply pipe 700 and the main fuel supply pipe 600, to thereby determine a supply of the fuel to the entire combustion apparatus.

According to the combustion apparatus and the gas turbine including the same according to the present disclosure, by forming two fuel channels of the fuel nozzle, the flow rate of the fuel distributed to each channel may be controlled to thereby control the pressure ratio of the fuel mixed with the air.

Accordingly, a spray pressure of the fuel may be lowered to thereby minimize the fluctuation in the mixing ratio of fuel and air, and an unstable heat release may be reduced to thereby ultimately avoid instability in the combustion.

In addition, the pressure ratio may be controlled during instability in combustion to thereby avoid an acoustic resonance that may occur by the fuel of high pressure.

It should be understood that the effects of the present disclosure are not limited to the effects described above, but include all effects that can be deduced from the detailed description of the present disclosure or the configurations of the disclosure described in the claims.

The present disclosure is not limited to the above-described specific embodiments and descriptions, and various modifications can be made to those skilled in the art without departing from the gist of the present disclosure claimed in the claims and the modifications are within the scope of protection of the present disclosure.

What is claimed is:

1. A combustion apparatus comprising:
   a casing;
   a pilot nozzle disposed at the center of the casing and supplied with fuel by a pilot fuel supply pipe; and
   a plurality of main nozzles arranged around the pilot nozzle and supplied with fuel by a main fuel supply pipe, each main nozzle including a pair of parallel fuel channels, the pair of parallel fuel channels including a first fuel channel extending to a first fuel spray position of a corresponding main nozzle of the plurality of main nozzles and a second fuel channel extending to a second fuel spray position of the corresponding main nozzle,
   wherein the main fuel supply pipe includes a pair of fuel supply pipes for respectively supplying fuel to either channel of the pair of parallel fuel channels.

2. The combustion apparatus of claim 1, further comprising:
   a pilot fuel flow rate control valve for controlling a flow rate of the fuel supplied through the pilot fuel supply pipe; and
   a main fuel flow rate control valve for controlling a flow rate of the fuel supplied through the main fuel supply pipe.

3. The combustion apparatus of claim 2,
   wherein the main fuel supply pipe further includes a main pipe in which the main fuel flow rate control valve is installed, and
   wherein the pair of fuel supply pipes are branched from the main pipe.

4. The combustion apparatus of claim 3, further comprising a three-way valve installed in the main pipe to control a flow rate of fuel distributed to either channel of the pair of parallel fuel channels.

5. The combustion apparatus of claim 3, wherein the pair of fuel supply pipes include:
   a first fuel supply pipe branched from the main pipe and connected to a first main manifold for supplying fuel to one channel of the pair of parallel fuel channels; and
   a second fuel supply pipe branched from the main pipe and connected to a second main manifold for supplying fuel to the other channel of the pair of parallel fuel channels.

6. The combustion apparatus of claim 5, further comprising:
   a first two-way valve installed in the first fuel supply pipe to control a flow rate of fuel distributed to one channel of the pair of parallel fuel channels; and a second two-way valve installed in the second fuel supply pipe to control a flow rate of fuel distributed to the other channel of the pair of parallel fuel channels.

7. The combustion apparatus of claim 3, further comprising:
a first connection pipe for daisy-chaining one channel of the pair of parallel fuel channels of each main nozzle, which channels are respectively adjacent to one another; and
a second connection pipe for daisy-chaining the other channel of the pair of parallel fuel channels of each main nozzle, which channels are respectively adjacent to one another,
wherein the pair of fuel supply pipes includes first and second fuel supply pipes respectively branched from the main pipe, the first fuel supply pipe being connected to only one of the channels daisy-chained by the first connection pipe, the second fuel supply pipe being connected to only one of the channels daisy-chained by the second connection pipe.

8. The combustion apparatus of claim 1, further comprising a controller for controlling a flow rate of fuel distributed to either channel of the pair of parallel fuel channels.

9. The combustion apparatus of claim 8, wherein the flow rate of the distributed fuel is controlled according to a pressure ratio of the fuel mixed with air.

10. The combustion apparatus of claim 9, wherein the fuel of the main fuel supply pipe is delivered entirely to only one channel of the pair of parallel fuel channels when a pressure of the fuel is lower than or equal to a pressure of the air, and the fuel of the main fuel supply pipe is divided and distributed to either channel of the pair of parallel fuel channels respectively when the pressure of the fuel is higher than the pressure of the air.

11. The combustion apparatus of claim 9, wherein, when a pressure of the fuel is higher than a pressure of the air, the fuel of the main fuel supply pipe is distributed to either channel of the parallel fuel channels and is otherwise delivered entirely to only one channel of the parallel fuel channels.

12. The combustion apparatus of claim 8, wherein, when combustion instability occurs, the fuel of the main fuel supply pipe is distributed to either channel of the parallel fuel channels and is otherwise delivered entirely to only one channel of the parallel fuel channels.

13. The combustion apparatus of claim 1, wherein the respective fuel spray positions of the pair of parallel fuel channels each occur where the fuel is sprayed into a mixing zone for pre-mixing air and fuel.

14. The combustion apparatus of claim 1, wherein
the fuel spray position of one of the pair of parallel fuel channels occurs where the fuel is sprayed into a mixing zone for pre-mixing air and fuel, and
the fuel spray position of the other of the pair of parallel fuel channels occurs where the fuel is sprayed to a zone in which the air and the fuel meet and a diffusion flame occurs.

15. The combustion apparatus of claim 1,
wherein the the first fuel channel extends lengthwise along one side of the corresponding main nozzle, and
wherein the second fuel channel extends lengthwise along a side opposite to the one side of the corresponding main nozzle, in parallel to the first fuel channel.

16. A gas turbine comprising:
a compressor for sucking air and compressing the sucked air to a high pressure;
a plurality of combustors for mixing the compressed air with fuel and combusting the mixture, each combustor comprising:
a casing,
a pilot nozzle disposed at the center of the casing, and
a plurality of main nozzles arranged around the pilot nozzle, each main nozzle including a first fuel channel extending to a fuel spray position of the first fuel channel and a second fuel channel extending to a fuel spray position of the second fuel channel;
a turbine for generating electric power by rotating a turbine blade using high temperature and high pressure combustion gas discharged from the combustors;
a pilot manifold connected to the respective pilot nozzles of the plurality of combustors and supplied with fuel by a pilot fuel supply pipe; and
a main manifold connected to the respective main nozzles of the plurality of combustors and supplied with fuel by a main fuel supply pipe,
wherein the main fuel supply pipe of the main manifold includes:
a first fuel supply pipe supplying the fuel to a first main manifold connected to each of the first fuel channels; and
a second fuel supply pipe supplying the fuel to a second main manifold connected to each of the second fuel channels.

17. The gas turbine of claim 16, further comprising:
a pilot fuel flow rate control valve for controlling a flow rate of the fuel supplied through the pilot fuel supply pipe; and
a main fuel flow rate control valve for controlling a flow rate of the fuel supplied through the main fuel supply pipe.

18. The gas turbine of claim 17,
wherein the main fuel supply pipe of the main manifold further includes a main pipe in which the fuel flow rate control valve is installed, and
wherein the first fuel supply pipe and the second fuel supply pipe are branched from the main pipe.

19. The gas turbine of claim 18, further comprising a three-way valve installed at a point at which the first fuel supply pipe and the second fuel supply pipe are branched from the main pipe to control the flow rate of the fuel distributed to the first fuel supply pipe and the second fuel supply pipe.

20. The gas turbine of claim 18, wherein
a plurality of first main branch pipes extend to connect the first fuel channels of the respective combustors from the first main manifold, one first main branch pipe is connected to connect one first fuel channel per each combustor, and the respective first fuel channels of the respective combustors are all connected to each other by a first connection pipe connecting the first fuel channels which are adjacent to each other, and
a plurality of second main branch pipes extend to connect the second fuel channels of the respective combustors from the second main manifold, one second main branch pipe is connected to connect one second fuel channel per each combustor, and the respective second fuel channels of the respective combustors are all connected to each other by a second connection pipe connecting the second fuel channels which are adjacent to each other.

* * * * *